United States Patent [19]

Larsen

[11] 4,148,597

[45] Apr. 10, 1979

[54] APPARATUS AND METHOD FOR PRESSURE MOLDING COMPOSITE STRUCTURAL PARTS

[75] Inventor: George E. Larsen, Hawthorne, Calif.

[73] Assignee: Northrop Corporation, Los Angeles, Calif.

[21] Appl. No.: 829,940

[22] Filed: Sep. 1, 1977

[51] Int. Cl.² .................. B29C 1/00; B29C 3/00
[52] U.S. Cl. .................. 425/389; 425/DIG. 19; 100/48; 100/211; 264/314
[58] Field of Search .................. 425/389, DIG. 19; 264/313, 314, 325; 100/48, 211, 269, 275, 299

[56] References Cited

U.S. PATENT DOCUMENTS

| | | | |
|---|---|---|---|
| 2,489,643 | 11/1949 | Hunter | 425/389 |
| 3,594,877 | 7/1971 | Suda | 425/389 |
| 3,614,811 | 10/1971 | Johnson | 425/389 |
| 3,674,394 | 7/1972 | Wiltshire | 425/389 |

Primary Examiner—W. E. Hoag

Attorney, Agent, or Firm—William W. Rundle; Willard M. Graham

[57] ABSTRACT

An apparatus and method for molding structural parts from fiber reinforced plastic composite. The apparatus is comprised of a rigid container, one or more pads of silicone rubber housed inside the container to exert pressure on the part, and one or more expandable diaphragms housed inside the container to control the pressure exerted on the part by the pads. The method used to mold a complex-shaped part from fiber reinforced plastic composite material is to lay up the part on the pads and place the pads, together with the part, between the diaphragms which are housed in the container. The container is then closed and placed in a temperature control chamber and the diaphragms connected to an external pressure control system, after which the part is cured by increasing the temperature of the chamber to the curing temperature of the part, while at the same time controlling the pressure exerted on the part by controlling the pressure in the diaphragms.

6 Claims, 4 Drawing Figures

APPARATUS AND METHOD FOR PRESSURE MOLDING COMPOSITE STRUCTURAL PARTS

BACKGROUND OF THE INVENTION

The present invention relates to an apparatus and method of forming and curing fiber reinforced plastic composite structural parts using in combination, temperature and controlled pressure.

Prior to the present invention the method used to form a structural part, from a material such as graphite/epoxy, was to lay up the material on a fixture or a flat table and subsequently transfer it to a bonding fixture. The part, together with its bonding fixture, was then vacuum bagged using either a butyl or silicone rubber bag. After bagging, the part was debulked by vacuum means to remove entrapped air and the assembly with vacuum applied was transferred to a temperature controlled chamber for curing. After curing, the assembly was removed from the temperature controlled chamber and allowed to cool before removing the part. The basic shortcomings of the above prior art method are: (1) the part must be vacuum bagged to remove entrapped air from between the layups of material, (2) means are not provided to bleed the part for removal of excess resins while the part is being formed, and (3) a combination of variable control pressure and temperature is not applied to the part during the cure cycle.

PRIOR ART STATEMENT

U.S. Pat. No. 1,909,444 entitled "Method and Means for Making Laminated Glass" and U.S. Pat. No. 2,445,209 entitled "Hollow Cavited Bodies Such As Rigid Hollow Panel Structures and Method of Making the Same" are relevant to the present invention only in that they each utilize pressure and temperature in bonding laminates. Neither anticipates the apparatus or method herein described and claimed for molding composite structural parts.

BRIEF SUMMARY OF THE INVENTION

The present invention provides a molding apparatus and method for forming precise and structurally sound parts from composite material. The apparatus comprises a holding container which houses one or more bellows, depending on the shape of the part to be formed, and a mold made of silicone rubber or its equivalent. The parts formed by the present invention require no trimming after being removed from the apparatus. The bellows are connected to an external pressure source and controls the pressure that the mold is allowed to exert on the part during forming and curing of the part.

An object of the present invention is to provide an apparatus for forming structural parts of composite material which allows the part to be pre-bled and debulked without utilizing vacuum means. Another object is to provide a means to variably control the pressure exerted on a composite part during its forming. Still another object is to provide a reusable rubber mold which can be used as a layup tool for a composite part. A still further object is to provide a method for forming and curing composite parts, using in combination variable control pressure and temperature.

Although the characteristic features of the present invention are particularly pointed out in the appended claims, the invention itself, also the method used in practicing the invention, will be better understood by referring to the following description taken in conjunction with the accompanying drawings.

BRIEF DESCRIPTION OF THE DRAWINGS

FIG. 4 is a sectional view taken along line 4—4 of FIG. 3 showing the apparatus of FIG. 3 in an assembled relationship, housed in a temperature controlled chamber, and connected to a pressure source.

DESCRIPTION OF THE PREFERRED EMBODIMENTS

Figure 2:
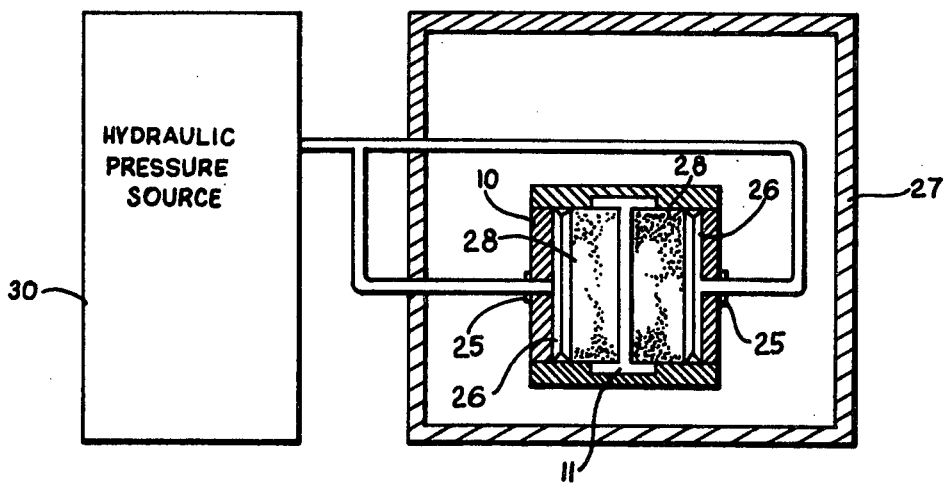
FIG. 2 is a sectional view taken along line 2—2 of FIG. 1 showing the apparatus of FIG. 1 in an assembled relationship, housed in a temperature-controlled chamber, and connected to a pressure source.

Referring first to FIG. 2, the apparatus is typical of the configuration used to mold a composite I beam-shaped part 11. The molding of the composite I beam-shaped part 11 is selected by way of example only. Obviously any complex-shaped part can be molded by various configurations of the apparatus 10.

Figure 1:
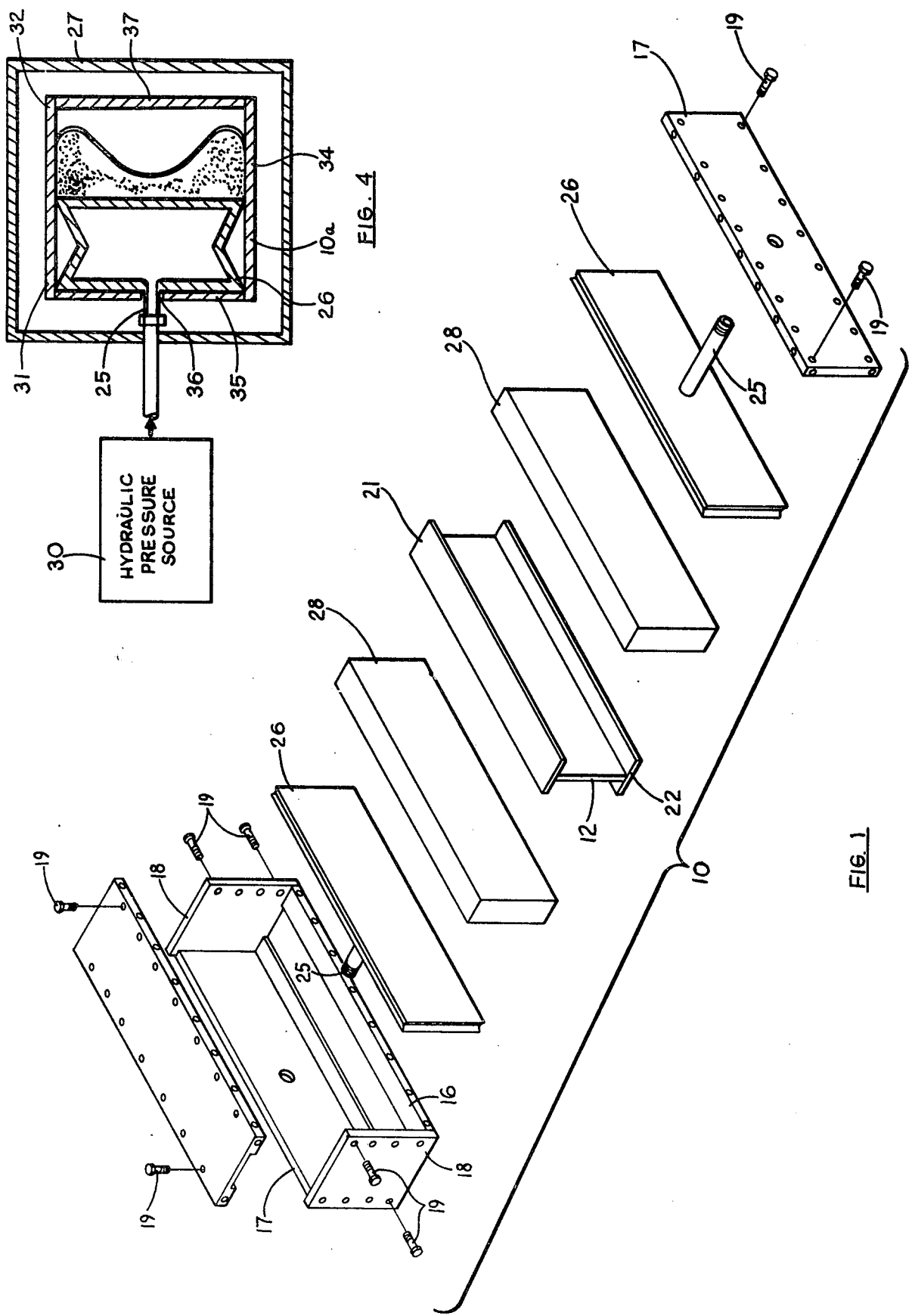
FIG. 1 is an exploded view, in perspective, of apparatus embodying the present invention to mold a complex-shaped part from fiber reinforced plastic material.

Referring now to FIG. 1, the internal configuration of the apparatus 10 utilized in molding the I beam-shaped part 11 is dictated by the shape of part 11 (best seen in FIG. 2). In the case of a complex part such as the I beam-shaped part 11, it is first necessary to manufacture or select a sample part 12 identical in shape to part 11. Next, a rigid container 14 (shown assembled in Figure) is manufactured to hold the sample part 12.

The rigid container 14 is a box-like structure having a removable top plate 15, a bottom plate 16, two identical side plates 17, and two identical end plates 18, with the container 14 normally held together by a plurality of bolts 19.

Both the top plate 15 and the bottom plate 16 are provided with a groove 20 which has the same width and depth as the top flange 21 and bottom flange 22 of the sample part 12, and each side plate 17 is provided with a hole 24 to allow for a pipe 25 of a bellow 26 to extend therethrough.

After the components of the rigid container 14 are manufactured, they are assembled except for bolting on the top plate 15. The two bellows 26 are placed inside the container 14 with their fluid supply pipes 25 extending through the holes 24, located in the side plates 17. The sample part 12 is then placed inside the container 14 with its bottom flange 22 resting in the groove 20 located in the bottom plate 16.

A room temperature-curing silicone rubber is then poured into the container 14 filling the space between each diaphragm 26 and the sample part. Upon curing, the silicone rubber forms two reusable pads 28 which are the final items required to complete the apparatus 10 for molding the I beam-shaped part 11. The room temperature curing rubber is selected for convenience only. If preferred, the pressure pads 28 can be cut from a solid piece of rubber. After the pressure pads 28 are made, they may be used any number of times to produce any number of identical I beam-shaped parts 11.

The method utilized in molding the I beam-shaped part 11 from a fiber-reinforced plastic composite material is to first lay-up the part 11 on the pressure pads 28, or alternately on a layup tool (not shown) and transfer the laid-up part 11 to the pressure pad 28. Next, all inside surfaces of the apparatus 10 are coated with a parting agent such as silicone or a fluorocarbon polymer to prevent the epoxy, present in part 11, from adhering to any inside surface of the apparatus 10. For production runs, all inside surfaces of the apparatus 10 are covered with a teflon type material and therefore coating the inside surface of the apparatus 10 with a parting agent is not required.

The pads 28, with the laid-up part held therebetween, are then inserted between the diaphragms 26 which are in their respective places inside the container 14. The top plate 15 of the container 14 is then bolted in place and the container 14 transferred to a temperature controlled heating chamber 27 (shown in FIG. 2). The fluid supply pipe 25 of the bellows 26 are then connected via conduits 29 (shown in FIG. 2) to an external fluid pressure control source 30 (shown in FIG. 2), and the chamber 27 is closed thereafter.

In a preferred mode, a variable hydraulic pressure source 30 is used. However, any type pressure source can be used provided it is capable of selectively maintaining any given fluid pressure within the range of approximately 200 to 600 psi. After the bellows 26, which are the preferred means used for exerting pressure on the pads 28, are connected to the pressure source 30 and the chamber 27 is closed, the curing cycle is started by applying a debulking pressure of preferably between 200 psi and 275 psi to each pad 28. While maintaining this debulking pressure constant, the temperature inside the chamber 27 is slowly brought up to a debulking temperature of about 120° F to 220° F, and the container 14 temperature stabilized. It should be noted that the pads 28 are temperature responsive and will start softening and expanding at about 150° F. Therefore, the pressure source 30 is required to compensate for this expansion and maintain the debulking pressure by releasing some of the fluid from the bellows 26. It should also be noted that the part 11 is pre-bled of trapped air and excess resin during the time that the temperature of the container 14 is being stabilized at approximately 120° F to 220° F.

When the temperature of the container 14 is temperature stabilized within the range of 120° F to 220° F, the pressure in the bellows is increased to a curing pressure within the range of 400 psi to 600 psi. This pressure is held constant while the temperature of the chamber 27 is brought up to a curing temperature of about 240° F to 365° F, and the temperature of the container 14 is temperature stabilized, curing the part 11. After the part 11 is cured, the temperature source for chamber 27 is then turned off and the part 11 allowed to cool to handling temperature. The pressure in the bellows 26 is then relieved, the chamber 27 opened, and the part 11 removed. Any number of identical parts 11 can now be formed by repeating the procedure described above.

Figure 3:
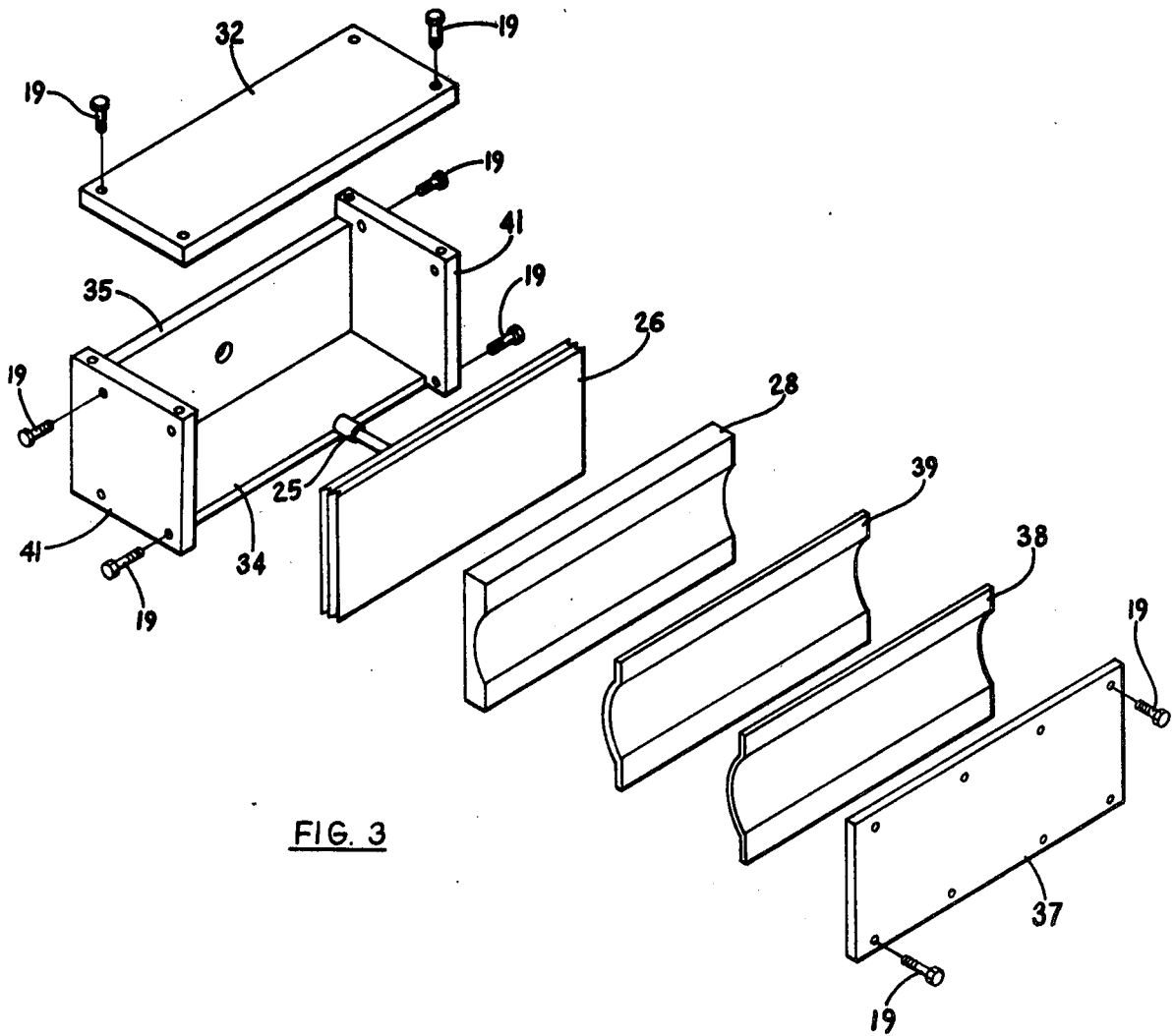
FIG. 3 is an exploded view in perspective of apparatus embodying the present invention used to mold a concave/convexed shaped structural part from the composite material.

Referring to FIG. 3, the configuration of a similar apparatus 10a utilized in pressure molding of a convex/concave part 39 comprises: a box-like structure 31 (shown assembled in FIG. 4) having a top member 32, a bottom member 34, a first side member 35 which is provided with a clearance hole 36 through which the fluid supply pipe 25 of the diaphragm 26 is allowed to extend, a second side member 37, and two identical end members 41.

Housed inside the box-like structure 31 is the diaphragm 26, a rigid convex/concave mandrel 38, having the desired shape of the part to be pressure molded, and a pressure pad 28 configured to mate with the convex/concave mandrel 38. The box-like structure 31 is releasably held together by bolts 19.

FIG. 4 shows the apparatus 10a housed in a temperature controlled chamber and connected to the pressure source 30. The procedure utilized in pressure molding the concave/convex part 39 is substantially the same as that described above in pressure molding of complex-shaped parts such as the I-beam 11, shown in FIG. 2. The basic differences are that only one bellows 26 is required in pressure molding the concave/convex part 39, and the part 39 is normally layed up on the mandrel 38 with the concave/convex part 39 together with the mandrel 38 inserted into the box-like structure as one unit.

Obviously, flat parts (not shown) can be formed by eliminating the mandrel 38 and by using a flat pressure pad (not shown). While in order to comply with the statute, the invention has been described in language more or less specific as to the structural features of the apparatus and the means of pressure forming three different configurations of structural parts, it is to be understood that the invention is not limited to the specific features shown and described, but that the construction of the apparatus herein disclosed and the method described comprises the preferred form of practicing the invention, and the invention is therefore claimed in any of it forms or modifications within the valid scope of the appended claims.

I claim:
1. An apparatus for molding structural parts from composite material for use with a standard temperature controlled heating device and a variable pressure source; the apparatus comprising:
 a. a rigid container,
 b. heat expansive resilient means housed in said container to exert pressure on said part, and
 c. variable pressure exerting means, adapted to compensate for expansion of said expansive means, housed in said container adjacent to said resilient means and connected to said variable pressure source, whereby the pressure exerted on said part by said resilient means is controllable by said variable pressure source.

2. The apparatus as set forth in claim 1 in which said resilient means comprises one or more reusable rubber pads having one surface corresponding to the adjacent portions of said part.

3. The apparatus as set forth in claim 1 in which said variable pressure exerting means comprises one or more bellows.

4. An apparatus for molding structural parts from composite molding material comprising:
 a. a rigid container,
 b. a heat expansive resilient means housed in said container adapted to exert pressure on said molding material within said container, and
 c. An expandable bellows housed in said container adjacent to said resilient means for controlling the pressure exerted on said part by said resilient means.

5. The apparatus as set forth in claim 4 in which said resilient means is a formed room-temperature-cured rubber pad having at least one surface corresponding to the adjacent portion of said part.

6. The apparatus as set forth in claim 4 in which said apparatus includes a convex/concave shaped mold having one surface corresponding to the shape of said part.

* * * * *